United States Patent [19]

Kita et al.

[11] Patent Number: 5,502,579
[45] Date of Patent: Mar. 26, 1996

[54] COLOR IMAGE PROCESSING METHOD AND APPARATUS CAPABLE OF ADJUSTING THE UCR RATIO

[75] Inventors: Shinji Kita; Hitoshi Ogatsu; Kazumasa Murai, all of Kanagawa, Japan

[73] Assignee: Fuji Xerox Co., Ltd., Tokyo, Japan

[21] Appl. No.: 138,430

[22] Filed: Oct. 20, 1993

[30] Foreign Application Priority Data

Sep. 10, 1993 [JP] Japan .................................. 5-248475

[51] Int. Cl.⁶ ................................ H04N 1/56; H04N 1/60
[52] U.S. Cl. ........................ 358/518; 358/520; 358/529
[58] Field of Search ................................... 358/518, 529, 358/519, 520, 521, 532, 523; 382/163, 167

[56] References Cited

U.S. PATENT DOCUMENTS

| | | | |
|---|---|---|---|
| 4,661,843 | 4/1987 | Sekizawa et al. | 358/520 |
| 4,745,467 | 5/1988 | Sekizawa et al. | 358/523 |
| 4,985,759 | 1/1991 | Ito | 358/529 |
| 5,031,034 | 7/1991 | Shimizu et al. | 358/529 |
| 5,283,671 | 2/1994 | Stewart et al. | 358/532 |
| 5,331,440 | 7/1994 | Kita et al. | 358/529 |
| 5,402,253 | 3/1995 | Seki | 358/518 |

FOREIGN PATENT DOCUMENTS

| | | |
|---|---|---|
| 57-173838 | 10/1982 | Japan . |
| 58-190951 | 11/1983 | Japan . |
| 58-211757 | 12/1983 | Japan . |
| 59-163973 | 9/1984 | Japan . |
| 59-161981 | 9/1984 | Japan . |
| 284074 | 11/1989 | Japan ............................. H04N 1/46 |
| 4-31859 | 2/1992 | Japan . |
| 4-104575 | 4/1992 | Japan . |
| 4-142877 | 5/1992 | Japan . |

OTHER PUBLICATIONS

"Proceedings of 1st Joint Conference on Color Technology," Four Optics Society, Nov. 20–21, 1984, pp. 1–7.
"Principles of Color Reproduction Applied To Photomechanical . . . " by J.A.C. Yule, Publication Department of Printing Society, 1971 pp. 247–248.

*Primary Examiner*—Scott A. Rogers
*Attorney, Agent, or Firm*—Finnegan, Henderson, Farabow, Garrett & Dunner

[57] ABSTRACT

A lightness/chromaticity separation device converts three input color signals to $\{L^*, a^*, b^*\}$ signals. A chroma determination device determines a chroma signal $C^*$ based on the $\{a^*, b^*\}$ signals. An UCR ratio calculation device calculates an UCR ratio $\alpha$ according to a $C^*$-$\alpha$ function that is adjustable by changing parameters. A nonlinear conversion circuit determines output color signals of four colors including black based on the $\{L^*, a^*, b^*\}$ signals and the UCR ratio. The nonlinear conversion circuit includes a network-type combination of a plurality of analog nonlinear operation units.

14 Claims, 8 Drawing Sheets

COLOR IMAGE PROCESSING METHOD AND APPARATUS CAPABLE OF ADJUSTING THE UCR RATIO

BACKGROUND OF THE INVENTION

The present invention relates to a color image processing method and apparatus for converting three color signals read by an image input device to color image recording signals of a plurality of colors including black. More specifically, the invention relates to a color image processing method and apparatus for determining a black signal and what is called an under color removal (UCR) quantity in the image recording signals.

In the printing technologies, a color original image is usually recorded or reproduced by 4-color printing. That is, the printing is performed using color separation printing patterns for printing inks of yellow, magenta, cyan and black. This is due to the fact that three-color printing of yellow, magenta and cyan cannot produce reproduction images having sufficient contrast performance because, for instance, the inks do not have an ideal color development characteristic.

In some cases of the 4-color printing, the printing inks of yellow, magenta and cyan are subjected to what is called 100% under color removal, in which an image is reproduced using black ink and two of yellow, magenta and cyan inks. This technique has advantages that the color reproduction range is broadened in low lightness portions and gray stability is kept high in high lightness portions. Further, the under color removal serves to reduce consumption amounts of expensive color inks, to thereby lower the running costs.

Although the various advantages can be obtained by performing the under color removal in the 4-color printing, it is very difficult to determine the under color removal quantity and the black quantity in accordance with the input image signals. In general, since black ink has a higher contrast than the other inks, it likely enhances roughness of an image and therefore it is not appropriate to include a large quantity of black ink in human skin portions in an image. Further, the black quantity in character images needs to be larger than in photograph image, to increase the sharpness of characters.

Various techniques of determining the under color removal quantity and the black quantity in a printing color scanner are disclosed in Japanese Patent Application Unexamined Publication Nos. Sho. 57-173838, Sho. 58-190951, Sho. 58-211757, etc.

In the publication Sho. 57-173838, the under color removal is performed separately in chromatic color areas and in achromatic color areas. Achromatic color portions are reproduced only by black ink, and the black quantity is gradually changed in a transition area from an achromatic area to a chromatic area.

The publications Sho. 58-190951 and Sho. 58-211757 disclose techniques for determining the black quantity and the under color removal quantity in accordance with gradation levels of an input image. According to this technique, complete achromatic printing is performed up to a gray level corresponding to the over color of black ink used, and quantities of color inks are increased continuously in shadow areas having a gray level higher than the above level. That is, gray portions having a density within a range reproducible by black ink is reproduced only by black ink, and gray portions whose density exceeds the above range are reproduced using the same quantities of the other three color inks.

Further, techniques of determining the under color removal quantity and the black quantity in digital color recording technologies such as ink jet printing, thermal transfer recording and laser color xerography are disclosed in Japanese Patent Application Unexamined Publication Nos. Sho. 59-161981, Sho. 59-163973, etc. The publication Sho. 59-161981 describes an under color removal technique in which the black quantity is obtained by multiplying the minimum value of three color signals of yellow, magenta and cyan by a certain constant and subtracting the black quantity from the respective color signals. In the publication Sho. 59-163973, two color inks to be combined with black ink are determined from spectral reflectances of a plurality of inks, and the recording is performed such that the color inks and the black ink do not overlap each other. This technique can determine the black quantity and the under color removal quantity by a simple calculation.

However, in the technique of the publication Sho. 57-173838, many adjustment coefficients are needed in determining the black quantity and the under color removal quantity. Since the coefficients can be determined only empirically, the difficulty in determining the black quantity and the under color removal quantity still remains unsolved.

Since the publications Sho. 58-190951 and Sho. 58-211757 address only the processing on gray portions, a color quasi-outline, i.e., a chroma gap may occur in a transition area from an achromatic area to a chromatic area, i.e., in an image in which the chroma gradually varies (such as a usual color picture/pattern).

The technique of the publication Sho. 59-161981, which is generally called "constant ratio under color removal/ addition," has a problem that it cannot perform correct color reproduction. The reasons are described, for instance, in "Considerations (I) on Black Inclusion in Printing," Proceedings of 1st Joint Conference on Color Technologies Four Optics Societies, 1984, pp. 1–7.

In the publication Sho. 59-163973, since the calculation is based on the principles of the average additive mixture, it cannot perform correct color reproduction in actual recording. This problem originates from the light penetration and diffusion into a sheet, as described, for instance, in J. A. C. Yule, "Principles of Color Reproduction," Publication Department of Printing Society, 1971, pp. 247–248.

SUMMARY OF THE INVENTION

An object of the invention is to provide a color image processing method and apparatus which can perform correct color reproduction by a simple calculation without the need of empirical parameter adjustments, and which can perform black addition and under color removal without causing an unnatural chroma gap between an achromatic area and a chromatic area.

Another object of the invention is to provide a color image processing method and apparatus which can perform black addition and under color removal in a device-independent manner, i.e., independently of the types of image recording (printing, ink jet printing, thermal transfer recording, laser xerography, etc.).

Another object of the invention is to provide a color image processing method and apparatus in which the texture can be controlled in accordance with the input image and the UCR ratio can be switched depending on whether the input image is a photographic image or a character image.

A further object of the invention is to provide a color image processing method and apparatus which can perform correct color reproduction even with a higher UCR ratio and, as a result, can improve gray balance of a photographic image and quality of black characters.

A still further object of the invention is to provide a high-speed color image processing method and apparatus which attains the above objects with a smaller size circuit configuration by using a combination of a plurality of nonlinear operation units.

According to the invention, a color image processing apparatus comprises:

means for receiving three input color signals produced by a color image input device by reading a document;

means for converting the three input color signals to three uniform color signals on a uniform color space;

means for determining a chroma signal from the uniform color signals;

means for determining an under color removal ratio based on the chroma signal; and means for determining color output signals of four colors including black based on the three uniform color signals and the under color removal ratio.

With the above constitution, the three input color signals received from the color image input device are converted to the iso-perceptive luminance/chromaticity separation signals, for instance, 1976 CIE L*a*b* signals. The black addition and the under color removal are performed based on the luminance/chromaticity separation signals. As a result, the process well matches the human perception and can be generalized so as not to depend on the characteristics of the image input device.

Then, the chroma signal C* is generated based on the chromaticity signals according to its definition ($\{(a^*)^2+(b^*)^2\}^{1/2}$ for the L*a*b* signals), and the UCR ratio is determined according to the function that has been preliminarily set in an adjustable manner. In general, the UCR ratio should be set at 0 in a middle chroma range where memory colors such as a skin color, grass green and sky blue are located, because in that range the inclusion of black likely causes a rough image. On the other hand, to prevent a gray portion from being colored because of instability of a recording device, a gray portion needs to be reproduced singly by black (the UCR ratio is 1). Considering the above, in general, the UCR ratio function is so set as to decrease monotonically with the increase of the chroma.

Further, it is necessary to change the UCR ratio with the kind of input image. For example, the input image is a precise still life, the texture can be improved by increasing the UCR ratio over the entire image. On the other hand, for an image including a human as the main feature, such as a portrait, it is important to suppress roughness by decreasing the UCR ratio. Therefore, the UCR ratio should be set not in a fixed manner but in an adjustable manner. The number of adjusting parameters is limited to simplify the adjustment.

Then, the color output signals of cyan, magenta, yellow and black are determined from the UCR ratio and the three uniform color signals (e.g., L*a*b* signals). Since this operation is a four-input/four-output operation, the output color signals are uniquely determined. Therefore, the four output color signals satisfy faithful reproduction in a colorimetric sense with respect to the input color, and the invention is free from the problem of the conventional apparatus that the black addition and under color removal after the determination of three color output signals may prevent faithful reproduction depending on the color allocation. Further, since the four color output signals are output in a parallel manner, the apparatus of the invention can be practiced with a tandem-type recording device which records an image of the four color signals in a parallel manner (the ink jet type and electrophotographic type are presently available).

As described above, according to the invention, since it becomes possible to perform the UCR adjustment considering improvements of image qualities other than the color reproduction within the range of maintaining the faithful color reproduction, the faithful color reproduction and the improvements of image qualities (improvement of texture, stabilization of gray reproduction, reduction of graininess of memory colors, etc.) other than the color reproduction are realized at the same time. Further, since every processing step is device-independent and is performed using isoperceptive lightness/chromaticity separation signals that well match the human perception, the invention can be applied to a variety of image recording devices irrespective of their types and necessary adjustments are performed in a manner compatible with the human perception. In addition, the apparatus of the invention can be so constructed as to be able to accommodate high speed recording devices.

Further, since the apparatus of the invention includes the nonlinear conversion network circuit in the form of a combination of simple nonlinear operation units, it can operate at high speed and the four color parallel output processing can be realized by a small-size circuit configuration. The invention can provide much higher conversion accuracy than the conventional matrix-type color conversion by virtue of an increased degree of freedom of parameters. Compared with the polygonal line approximation type conversion (called the direct look-up table type conversion) on a color space in which conversion outputs for representative points on the color space are stored as a table and output values for arbitrary inputs are determined by linear interpolation on representative points in the vicinity of the inputs, the conversion of the invention is simpler in circuit constitution and superior in that the continuity and the differential continuity are assured in the input/output conversion to prevent quasi-outlines as would occur in reproducing an image including subtle color gradation in computer graphics etc.

DESCRIPTION OF THE PREFERRED EMBODIMENTS

Embodiments of the present invention are described hereinafter with reference to the accompanying drawings.

Figure 1:
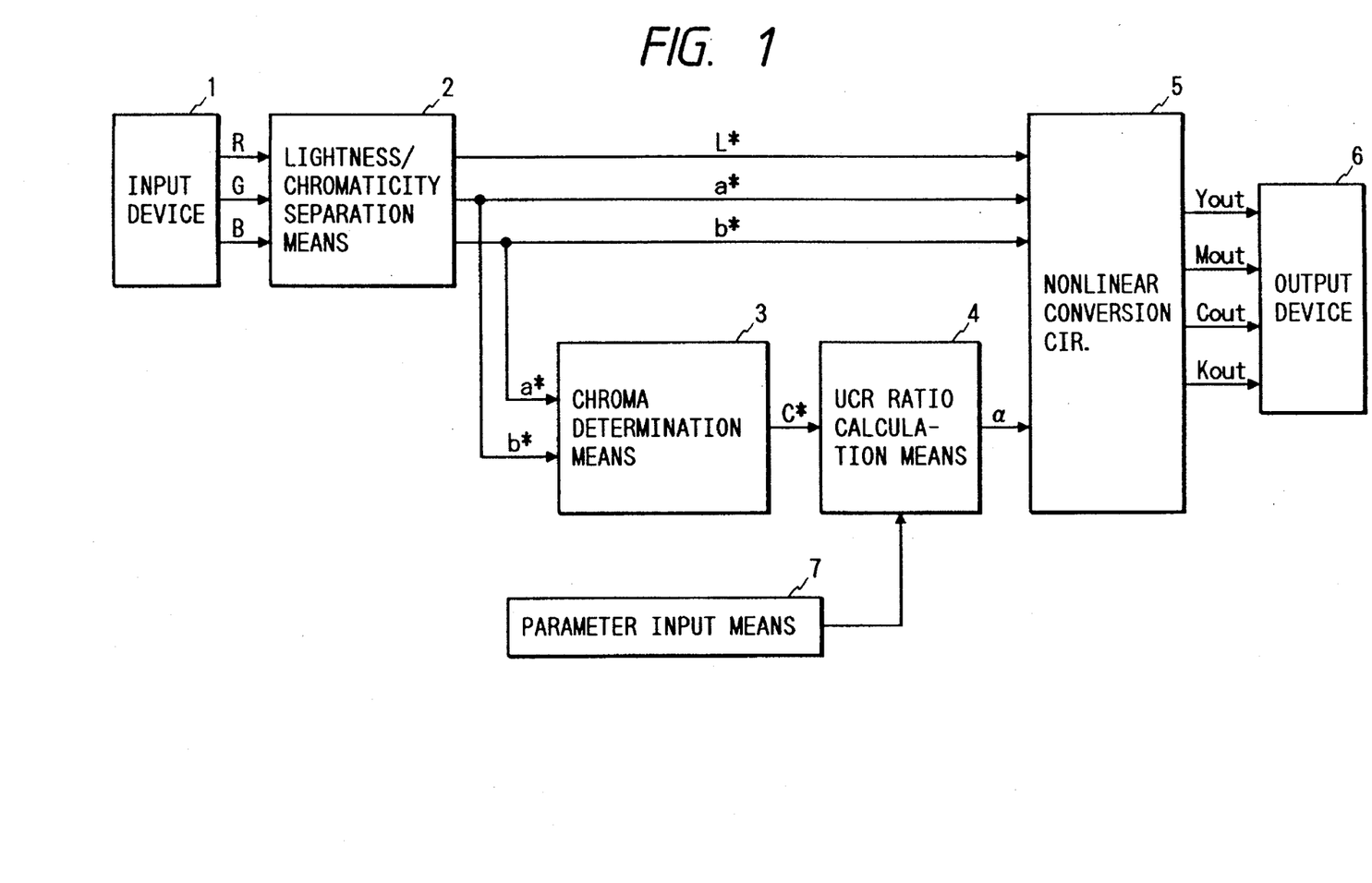
FIG. 1 is a block diagram showing the entire constitution of a color image processing apparatus according to an embodiment of the present invention.

FIG. 1 shows the constitution of a color image processing apparatus according to an embodiment of the invention. In FIG. 1, a color image input device 1 reads document information while decomposing it into three-color components. The document information thus read is converted to a digital signal by an A/D converter (not shown, incorporated in the input device 1), and output from the input device 1 as three color signals R, G and B in a parallel manner. The color signals R, G and B are converted by an equivalent neutral lightness conversion circuit (not shown) to equivalent neutral lightness signals $R_E$, $G_E$ and $B_E$, which are input to a lightness/chromaticity separation means 2.

The lightness/chromaticity separation means 2 is a means for converting the signals $R_E$, $G_E$ and $B_E$ to signals on a coordinate system which is "iso-perceptive" (a distance between two points on a coordinate system is proportional to a perceptual color difference) and device-independent. Since the 1976 CIE L*a*b* system is appropriate as such a coordinate space, this color representation system is employed in the following description.

A simple method of converting the $\{R_E, G_E, B_E\}$ signals to the $\{L^*, a^*, b^*\}$ signals is to utilize the conventional nonlinear masking technique. In this method, the coordinate system conversion is performed by higher order polynomials which approximate the conversion with minimum errors. The conversion according to the nonlinear masking technique is represented by the following general formulae:

$$L^*=F_1(R_E, G_E, B_E)$$

$$a^*=F_a(R_E, G_E, B_E) \quad (1)$$

$$b^*=F_b(R_E, G_E, B_E)$$

However, in the above method, since the polynomials are approximated based on experimental data for, for instance, N pairs of $\{R_E^i, G_E^i, B_E^i\}$ and $\{(L^*)^i, (a^*)^i, (b^*)^i\}$ where i=1, ..., N, the magnitude of local errors depends on the iso-perceptiveness of the experimental data. Usually, experimental data pairs are obtained by extracting color patches at equal intervals from an iso-perceptive developing system as represented by the Munsell color standard and reading those patches by the input device 1.

Of the $\{L^*, a^*, b^*\}$ signals output from the lightness/chromaticity separation means 2, the $\{a^*, b^*\}$ signals are input to the chroma determination means 3, which calculates a chroma signal $C^*$ according to the definition $$C^*=\{(a^*)^2+(b^*)^2\}^{1/2} \quad (2)$$

and outputs the result.

Figure 2:
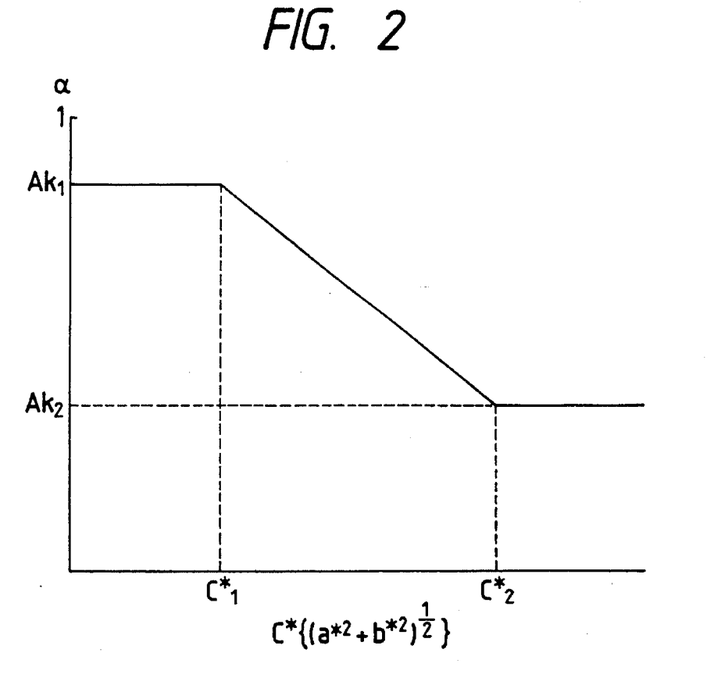
FIGS. 2 and 3 are graphs showing functions to determine an UCR ratio.

The chroma signal $C^*$ is input to an UCR ratio calculation means 4, which determines an UCR ratio $\alpha$ by an operation using parameters supplied from a parameter input means 7. As shown in FIG. 2, the parameters are given as two points $(C^*_1, Ak_1)$, $(C^*_2, Ak_2)$ on a $C^*$-$\alpha$ coordinate system. A relationship $Ak_1 > Ak_2$ holds in general and, to reproduce gray singly by black, it is desired that $Ak_1$ be equal to 1.

The parameter $C^*_1$ is set considering the gray reading accuracy in processing the input signals. In particular, the parameter $C^*_1$ is set based on a $C^*$ error when black thin lines such as black characters are read by the input device 1 and converted to $\{L^*, a^*, b^*\}$ signals. The parameter $C^*_2$ serves to limit the use of black, and is determined considering a chroma distribution of a memory color such as the human skin color. This is to prevent a case where black is used to reproduce a human skin color and some graininess is caused. Based on the above considerations, in the invention, the default parameters are set as follows:

$C^*_1=10$ $Ak_1=1$ $C^*_2=30$ $Ak_2=0 \quad (3)$

In the invention, since the UCR adjusting parameters are determined only from two coordinate points, they can easily be adjusted only by changing the two points independently within the ranges $0 \leq Ak \leq 1$ and $0 \leq C^*$. In general, this adjustment is performed in link with such adjusting mechanisms as a density/color adjustment and a sharpness adjustment, and is specifically effective in adjusting the texture of reproduced images in accordance with the kind of a document.

Figure 3:
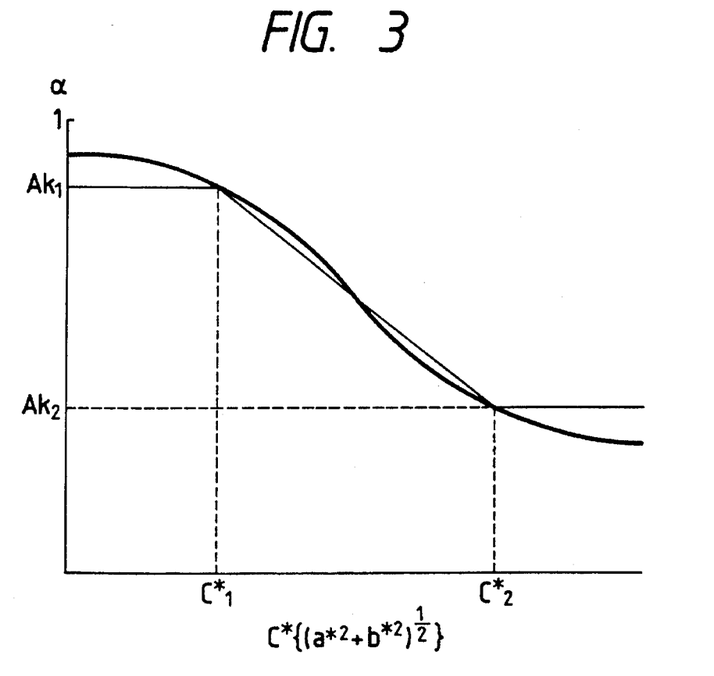

There may be employed two types of functions. The first type is a polygonal line function as shown in FIG. 2. In this case, using the adjusting parameters $(C^*_1, Ak_1)$, $(C^*_2, Ak_2)$ the UCR ratio $\alpha$ is expressed as follows:

$\alpha=Ak_1$ for $C^*<C^*_1$ $\alpha=(C^*-C^*_1)(Ak_2-Ak_1)/(C^*_2-C^*_1)+Ak_1$ for $C^*_1 \leq C^* < C^*_2$ $\alpha=Ak_2$ for $C^*_2 \leq C^* \quad (4)$ The second type is a monotonic, saturation-type continuous function (sigmoid function) as shown by a thick line in FIG. 3. In this case, using the adjusting parameters $(C^*_1, Ak_1)$, $(C^*_2, Ak_2)$ the UCR ratio $\alpha$ is expressed as follows:

$$\alpha=Ak_2+(Ak_1-Ak_2)[1-\tan h\{(\pi/2)(C^*-a)/b\}]/2 \quad (5)$$

where $a=(C^*_1+C^*_2)/2$ $b=(C^*_2-C^*_1)/2$.

The UCR ratio $\alpha$ is fixed at 1 when Eq. (5) takes a value larger than 1 and at 0 when it takes a negative value.

Which function type is desirable depends on the constitution of a nonlinear conversion circuit 5 that is provided at the next stage. The first type is suitable for a direct look-up table type color conversion circuit. This is so because the direct look-up table type conversion is a polygonal line type conversion on a color space in which conversion outputs for representative points on the color space are stored in the form of a table and outputs for arbitrary inputs are determined by linear interpolation on representative points in the vicinity of the inputs.

On the other hand, the second type is suitable for the nonlinear conversion circuit 5 (described later) of the invention, because the nonlinear conversion circuit 5 is a combination of conversion elements which exhibit continuous and differentially continuous characteristics. In this case, it is desired that a function for the UCR ratio be defined as also being continuous and differentially continuous.

Although in the embodiment Eq. (5) is used in the UCR ratio calculation means 4 for the above reason, the invention is not limited to Eq. (5) but may employ any proper function types.

The UCR ratio α output from the UCR ratio calculating means 5 and the {L*, a*, b*} signals output from the lightness/chromaticity separation means 2 are input to the nonlinear conversion circuit 5, which produces four output color signals of cyan, magenta, yellow and black. Being a 4-input/4-output conversion, this conversion is performed uniquely.

Figure 4:
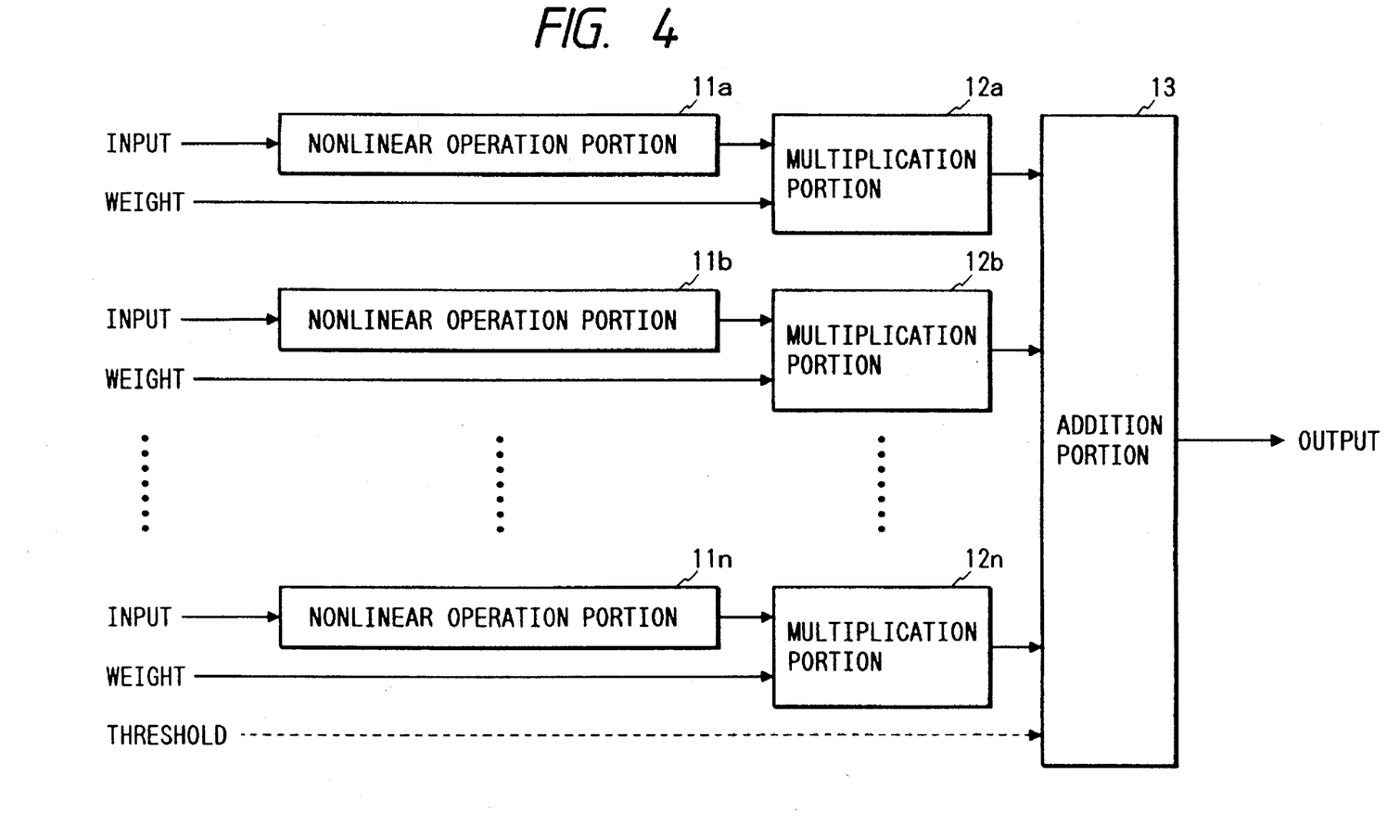
FIG. 4 is a block diagram showing constitution of a nonlinear operation unit used in a nonlinear conversion circuit.

The nonlinear conversion circuit 5 of this embodiment is constructed by combining nonlinear operation units as shown in FIG. 4. The nonlinear operation unit of FIG. 4 consists of nonlinear operation portions $11a$–$11n$ each for applying a nonlinear function $g(u_j)$ to each of one or more inputs $u_j$, multiplication portions $12a$–$12n$ for multiplying the respective outputs of the nonlinear operation portions $11a$–$11n$ by weights $w_{ji}$, and an addition portion 13 for adding up the outputs of the multiplication portions $12a$–$12n$ and further adding a threshold $\iota_i$ to the resulting sum. The threshold $\iota_i$ may be 0 to simplify the addition portion 13. An output $u_i$ of the nonlinear operation unit i is expressed as $$u_i = \sum_j w_{ji} g(u_j) + \iota_i \qquad (6)$$

In the nerve network theory, usually an output $x_i$ of each nerve i is expressed as $$x_i = g(u_i) \qquad (7)$$

where $u_i$ is an internal potential of the nerve i. The internal potential $u_i$ is expressed as $$u_i = \sum_j w_{ji} x_j + \iota_i \qquad (8)$$

where $x_j$ is an output of a nerve j, $w_{ji}$ is strength of connection from the nerve j to the nerve i and $\iota_i$ is a threshold of the nerve cell i. Therefore, a conventional circuit configuration that simulates a cell of a nerve network performs calculations according to Eqs. (7) and (8). The circuit includes a multiplication portion for multiplying the inputs $x_j$ by the respective weights $w_{ji}$ and an addition portion for adding up the outputs of the multiplication portion, and the nonlinear function $g(u_i)$ is applied to the resulting sum to obtain the output of the circuit.

Whereas the nonlinear operation unit of the nonlinear conversion circuit 5 of this embodiment has the circuit configuration different than the conventional circuit of simulating a cell of a nerve network, when a plurality of nonlinear operation units are combined to constitute a network, they operate equivalently to the conventional circuits for the entire nerve network. The above-described configuration of the nonlinear operation unit can be implemented as either a digital circuit or analog circuit. In particular, the analog nonlinear operation unit has smaller errors due to a temperature variation and circuit configuration and is simpler in circuit constitution and higher in processing speed than the conventional circuit simulating a cell of a nerve network. Therefore, this embodiment is directed to the case of implementing the nonlinear operation unit as an analog circuit.

In the following, the analog-type implementation of the nonlinear operation unit of the nonlinear conversion circuit 5 is described in detail. This nonlinear operation unit is disclosed in Japanese Patent Application No. Hei. 5-85157 filed by the present assignee and entitled "Nonlinear Operation Unit and Information Processing Apparatus Using the Same." The analog circuit includes differential amplifiers each consisting of a pair of three-terminal amplifying elements (bipolar transistors, FETs, electron tubes, etc) whose first terminals (emitters of bipolar transistors, sources of FETs, cathodes of electron tubes, etc.) are connected to each other. A voltage difference proportional to an input is applied between the second terminals (bases, gates, grids, etc.) of the pair of three-terminal amplifying elements that constitute each differential amplifier, and a current proportional to a weight for the multiplication are suitably supplied to the first terminals. An output of the differential amplifier is obtained at the third terminals (collectors, drains, plates, etc.) as a current difference.

Figure 5:
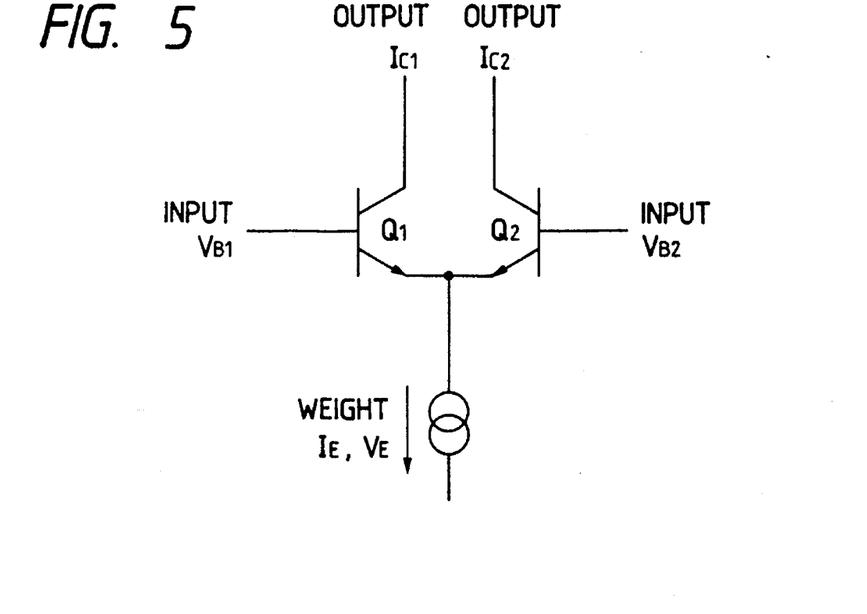
FIGS. 5 and 6 are circuit diagrams showing analog circuits used in the nonlinear operation unit.

FIG. 5 shows a specific example in which bipolar transistors are used. A difference between collector currents $I_{C1}$ and $I_{C2}$ of the respective transistors is $$I_{C1} - I_{C2} = I_E \cdot \tan h\{(V_{B1} - V_{B2})/2V_T\}. \qquad (9)$$

That is, in this circuit, the logistic function tan h is applied to the input voltage difference $V_{B1} - V_{B2}$ and the result is multiplied by the weight $I_E$ to produce the output current difference $I_{C1} - I_{C2}$. This circuit has characteristics to provide the above-described function of applying a nonlinear function to the input and multiplying the multiplication result by a proper weight.

Figure 6:
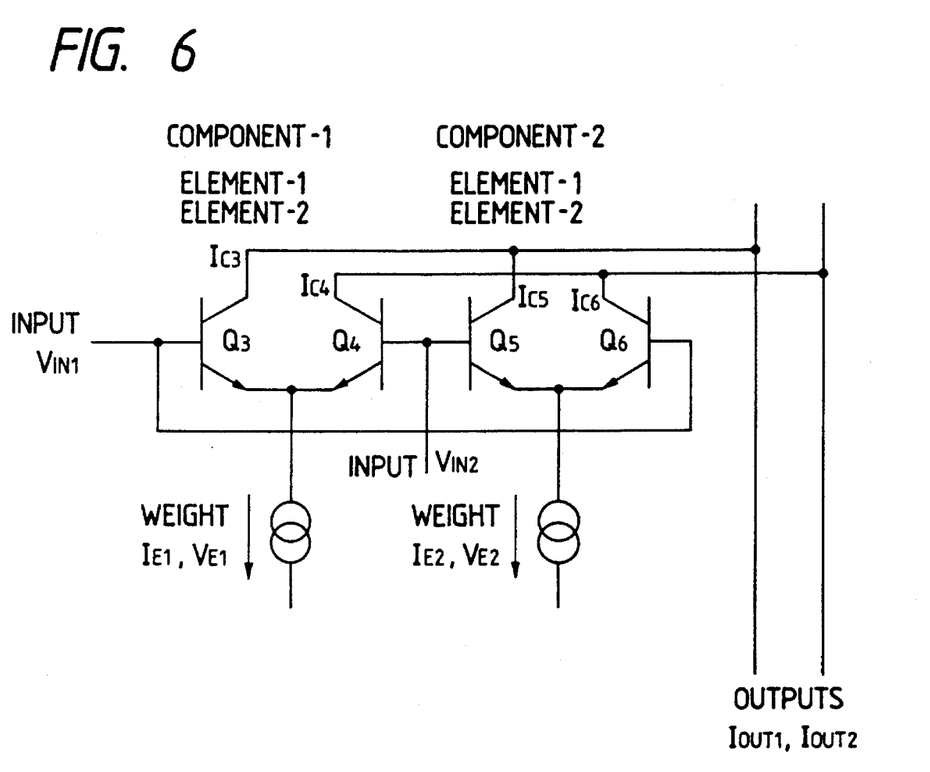

In the case of including positive and negative signs, the nonlinear operation unit has a configuration as shown in FIG. 6 in which the circuit of FIG. 5 is employed as the basic component. The first terminals (emitters) of three-terminal amplifying elements (element-1 and element-2) of component-1 are connected to each other and the first terminals (emitters) of three-terminal amplifying elements (element-1 and element-2) of component-2 are connected to each other to form respective differential amplifiers of component-1 and component-2. The second terminals (bases) of the three-terminal amplifying element (element-1) of component-1 and the three-terminal amplifying element (element-2) of component-2 are connected to each other to form an input terminal for $V_{IN1}$. The second terminals (bases) of the three-terminal amplifying element (element-2) of component-1 and the three-terminal amplifying element (element-1) of component-2 are connected to each other to form an input terminal for $V_{IN2}$ (This terminal may be grounded). Further, the third terminals (collectors) of the three-terminal amplifying element (element-1) of component-1 and the three-terminal amplifying element (element-1) of component-2 are connected to each other to form a first output terminal for $I_{OUT1}$. The third terminals (collectors) of the three-terminal amplifying element (element-2) of component-1 and the three-terminal amplifying element (element-2) of component-2 are connected to each other to form a second output terminal for $I_{OUT2}$.

With the above constitution, when the voltage difference $V_{IN1} - V_{IN2}$ that is proportional to the input and a current difference $I_{E1} - I_{E2}$ that is proportional to the weight are supplied to the circuit, a bounded, monotonic function is applied to the input, and the output $I_{OUT1} - I_{OUT2}$ that is proportional to the product of the function result and the weight (positive or negative) is obtained as follows:

$$I_{OUT1} - I_{OUT2} = (I_{E1} - I_{E2}) \cdot \tan h\{(V_{IN1} - V_{IN2})/2V_T\} \qquad (10)$$

while the above nonlinear operation unit of the nonlinear conversion circuit 5 of the invention is constituted of bipolar transistors, characteristics including a bounded, monotonic function and multiplication can be obtained by using other nonlinear amplifying elements having three or more terminals, such as FETs generally operating as balanced modulators, electron tubes having a remote cutoff characteristic and electron tubes having a variable-μ characteristic.

Figure 7:
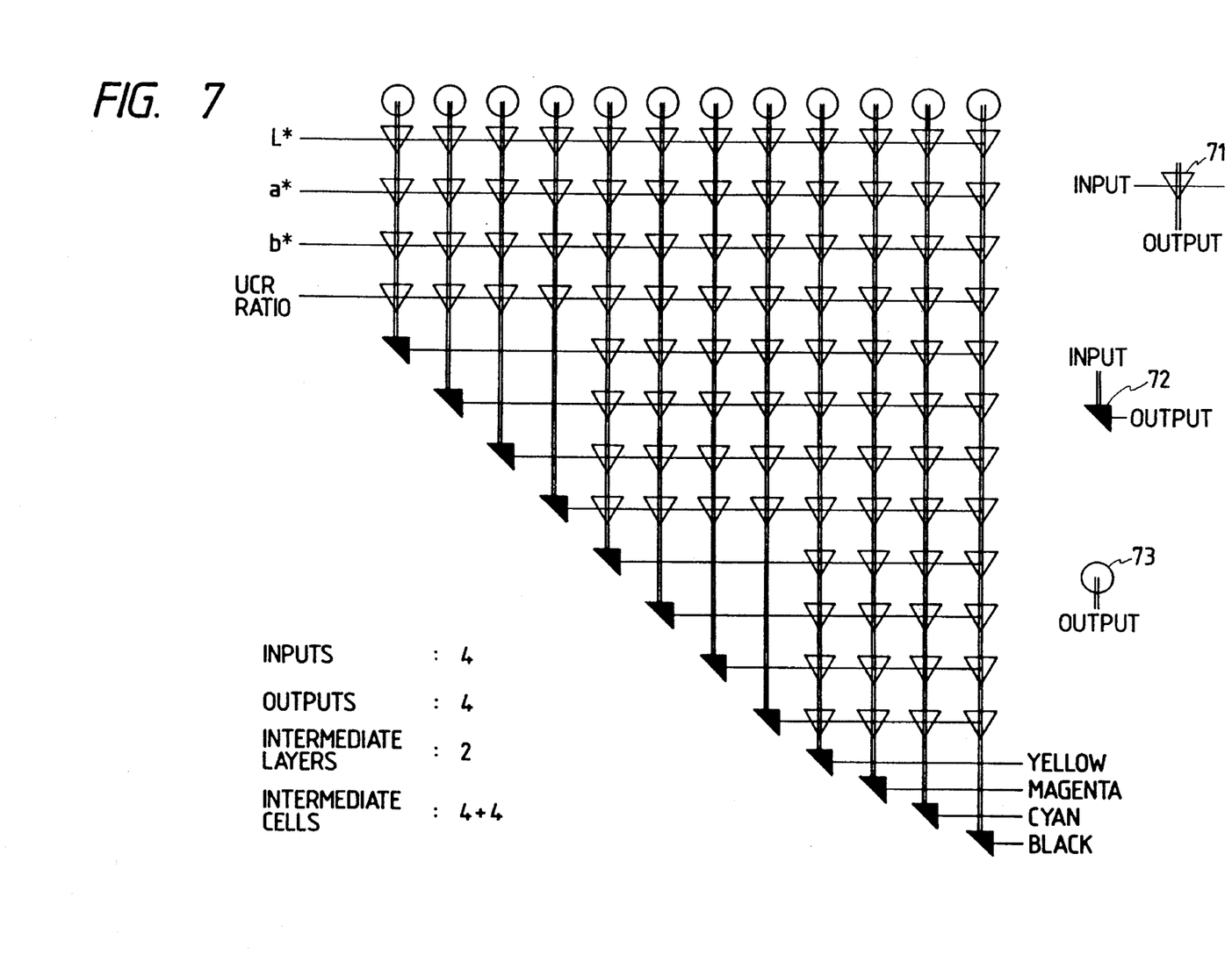
FIG. 7 shows a nonlinear operation network as a central portion of the nonlinear conversion circuit.
Figure 8A:
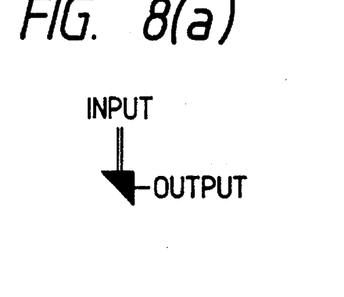
FIGS. 8(a) and 8(b) show a current difference to voltage conversion circuit used in the network of FIG. 7.
Figure 8B:
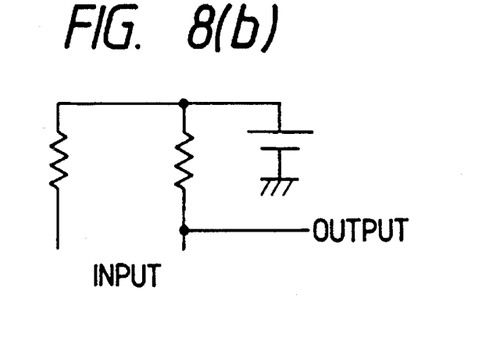
Figure 9A:
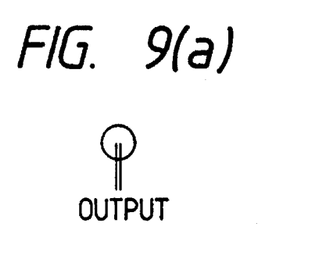
FIGS. 9(a) and 9(b) show a threshold circuit used in the network of FIG. 7.
Figure 9B:
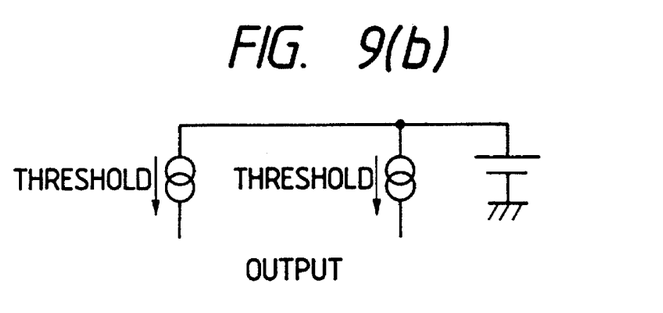

FIG. 7 shows an embodiment of a central conversion portion of the nonlinear conversion circuit 5, in which the nonlinear operation units are arranged in a network. The inputs to the network are the UCR ratio α from the UCR ratio calculation means 4 and the {L*, a*, b*} signals sent from the lightness/chromaticity separation means 2 and then analog-converted. The outputs of the network are four analog color signals of cyan, magenta, yellow and black. The network includes two intermediate layers and four intermediate cells for each layer. In FIG. 7, unit 71 represents the nonlinear operation unit of FIG. 6, unit 72 represents a current difference to voltage conversion circuit shown in FIGS. 8(a) and 8(b), and unit 73 represents a threshold circuit shown in FIGS. 9(a) and 9(b). This network as a whole can perform a desired input/output conversion that is nonlinear and continuous by optimize in advance the weights of the nonlinear operation units and the thresholds by a method described later.

Since the central conversion portion of the nonlinear conversion circuit 5 of the invention is a combination of the simple nonlinear operation units as described above, it can presents high processing speed and can produce a plurality of outputs in a parallel manner with a small-size circuit configuration. It can provide much higher conversion accuracy than the conventional matrix-type color conversion by virtue of an increased degree of freedom of parameters. Compared with the polygonal line approximation type conversion (called the direct look-up table type conversion) on a color space in which conversion outputs for representative points on the color space are stored as a table and output values for arbitrary inputs are determined by linear interpolation on representative points in the vicinity of the inputs, the conversion of this embodiment is simpler in circuit constitution and superior in that the continuity and the differential continuity are assured in the input/output conversion.

Figure 10:
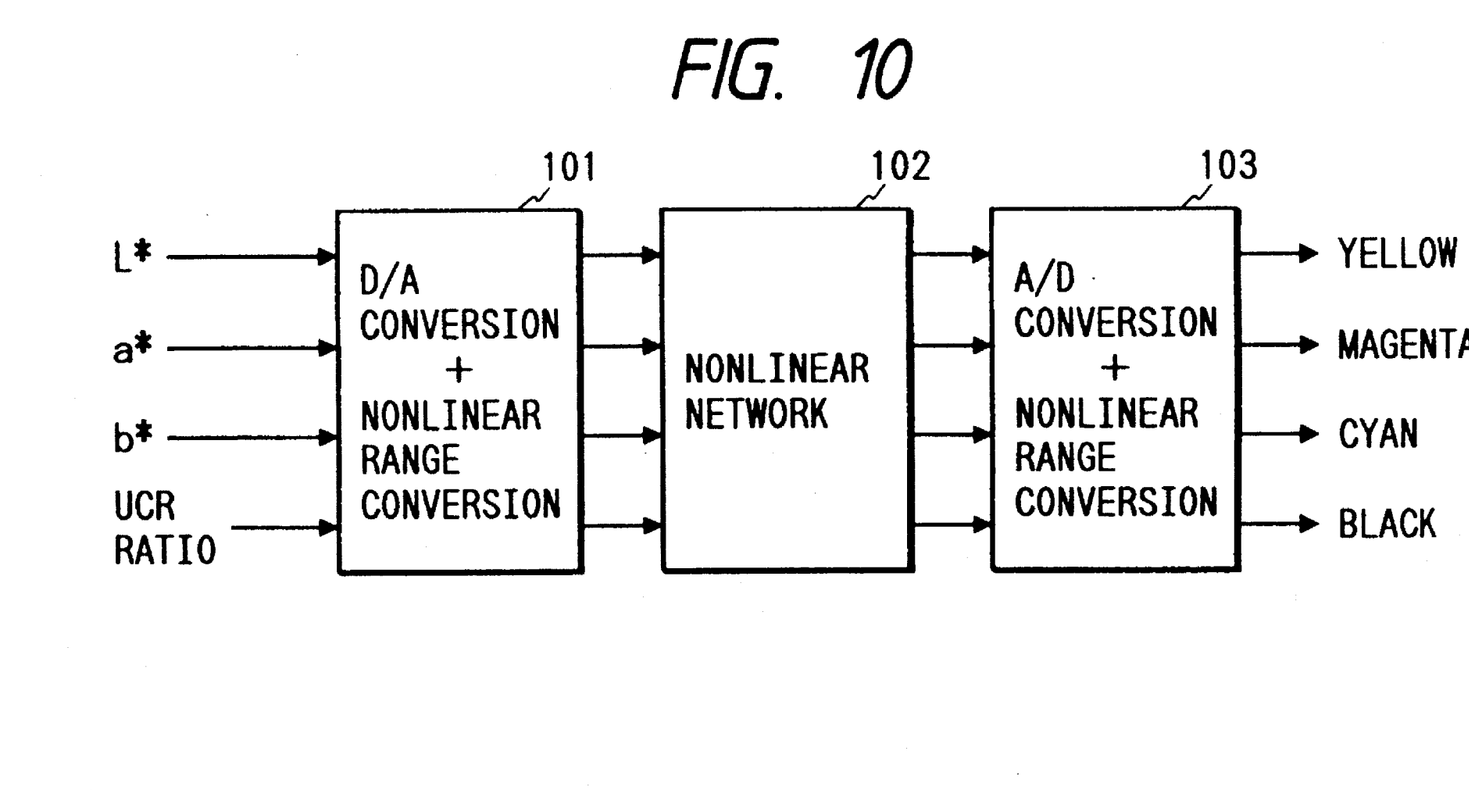
FIG. 10 is a block diagram showing the entire constitution of a nonlinear conversion circuit including a network of the type shown in FIG. 7.

Using the above input/output conversion portion as the central conversion portion of the nonlinear conversion circuit 5, the entire nonlinear conversion circuit 5 is constructed as shown in FIG. 10. In the nonlinear conversion circuit 5, a D/A conversion and nonlinear range conversion portion 101 and an A/D conversion and nonlinear range conversion portion 103 are provided before and after a nonlinear network 102 as described above (see FIG. 7), respectively. Thus, the nonlinear conversion circuit 5 supplies four color recording signals to a recording device. Where the recording device has an analog pulse width modulation means such as a laser, the A/D conversion and nonlinear range conversion portion 103 is not always necessary and may be omitted.

Next, a method for optimizing the weights and thresholds of the nonlinear conversion circuit 5 is described. The back propagation method, which is known in the nerve network theory, can be used for that purpose. In the back propagation method, desired outputs for inputs are given in advance as teacher signals and differences between actual outputs and the teacher signals are converted by using a certain function to an energy. The weights and thresholds are repeatedly converted until the energy decreases for a predetermined set of outputs and reaches 0 or is saturated. Since the energy function includes the weights and thresholds and every step of the conversion process is a combination of continuous functions, multiplications and additions, the energy function can be differentiated by the weights and thresholds (variables). Using the differentiated functions, the energy function can be decreased by changing the weights and thresholds so that the energy function decreases.

Figure 11:
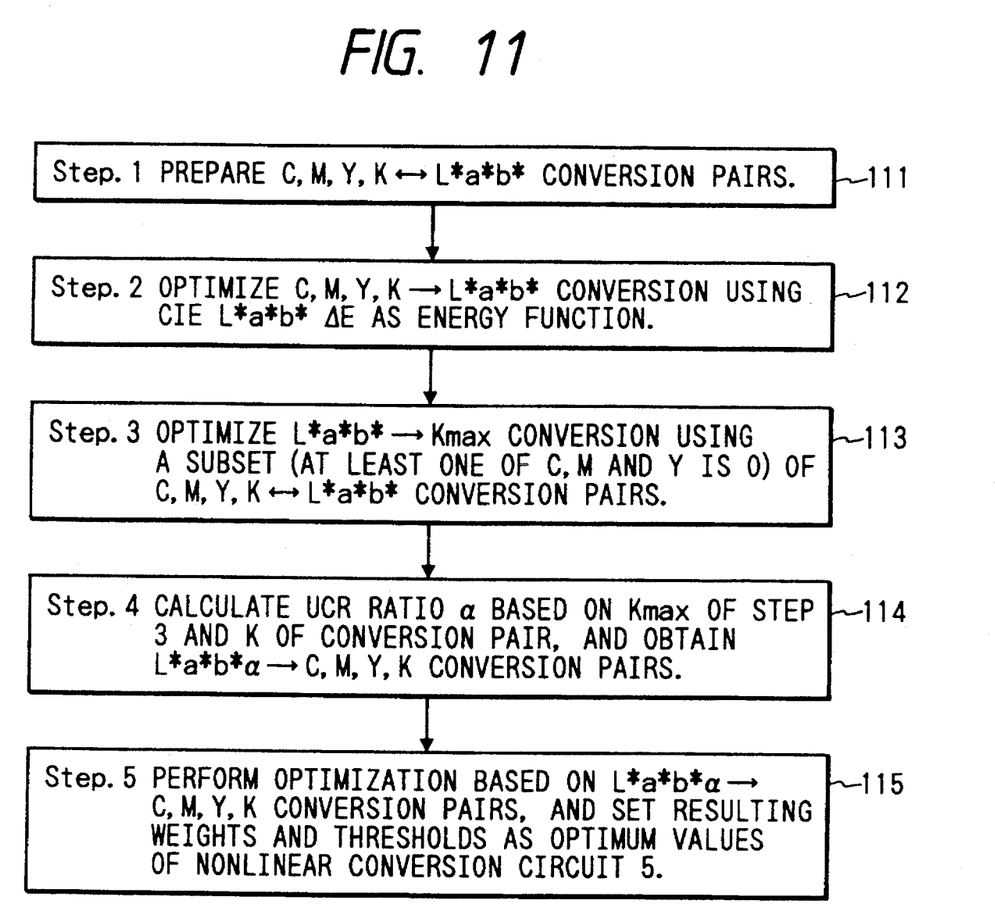
FIG. 11 is a flowchart showing a procedure executed by the nonlinear conversion circuit.

Referring to FIG. 11, we explain the procedure of optimizing the weights and thresholds of the nonlinear conversion circuit 5 of this embodiment.

Step 1

Conversion pairs between C,M,Y,K and L*a*b* are prepared in this step.

Known four color recording signals (C, M, Y, K) are input to a subject recording device to produce an actual color print sample. The color of the color printed sample is measured by a colorimeter on the market or the input device of the invention to produce L*a*b* signals. N ($=p^4$, for instance) input/output pairs of the above conversion are prepared considering the nonlinearity of the recording device.

Step 2

In this step, the conversion from C,M,Y,K to L*a*b* is optimized using CIE L*a*b* ΔE as the energy function.

The optimization is performed according to the back propagation method using the C,M,Y,K signals and the measured L*a*b* signals of the N conversion pairs prepared in Step 1 as the input and output teacher signals, respectively. Using CIE L*a*b* ΔE, the energy function is defined as follows:

$$E = \Sigma\{(L^*-L^{*\prime})^2+(a^*-a^{*\prime})^2+(b^*-b^{*\prime})^2\}^{1/2} \tag{11}$$

where $L^{*\prime}$, $a^{*\prime}$ and $b^{*\prime}$ are prediction output values.

Step 3

In this step, the conversion from L*a*b* to Kmax is optimized using a subset of the conversion pairs between C,M,Y,K and L*a*b*.

A subset in which at least one of C,M and Y is 0 is extracted from the conversion pairs between C,M,Y,K and L*a*b* prepared in Step 1. The optimization is performed for the subset according to the back propagation method using the L*a*b* signals as the input teacher signals and the K signal as the output teacher signal. Since all the K signals of the subset are for the reproduction of 100% UCR ratio, this conversion provides the maximum value Kmax of the settable K signal while conserving the given L*a*b* signal colorimetrically. The energy function E is defined as follows:

$$E = \{\Sigma(Kmax-Kmax')^2\}^{1/2} \tag{12}$$

where Kmax' is a prediction output value.

Step 4

In this step, the conversion from L*a*b*α to C,M,Y,K is optimized by calculating the UCR ratio α based on Kmax of Step 3 and K of Step 1.

First, Kmax is obtained for L*a*b* using the optimum conversion obtained in Step 3. On the other hand, by referring to the K signal of C,M,Y,K that corresponds to L*a*b*, the UCR ratio α is obtained as follows:

$$\alpha = K/Kmax \tag{13}$$

New conversion pairs between L*a*b*α and C,M,Y,K are obtained by subjecting all of the N conversion pairs of Step 1 to the above operation.

Step 5

In this step, the optimization is performed based on conversion pairs from L*a*b*α to C,M,Y,K and the resulting weights and thresholds are set as optimum values of the nonlinear conversion circuit 5.

The optimization is performed according to the back propagation method using L*a*b*α as the input teacher signals and C,M,Y,K as the output teacher signals. C',M', Y',K' which are prediction values of C,M,Y,K are evaluated according to Eq. (11) after being converted to L*'a*'b*' by the optimum conversion of Step 2 from C,M,Y,K to L*a*b*. As a result of the evaluation, the optimum weights and thresholds which minimize the energy function E of Eq. (11) are set as optimum values of the nonlinear conversion circuit 5.

The weights and thresholds of the nonlinear conversion circuit 5 are determined by performing the above steps, and an image of an input document is converted to desired color recording signals by the apparatus of FIG. 1. The above optimization process is practiced in a manner depending on the stability etc. of a recording device. If the recording device is very stable, the above steps may be performed preliminarily and the resulting weights and thresholds may be stored as characteristic values. On the other hand, if the recording device is not stable, the above optimization process may be incorporated, as one of its functions, into a color copier which is equipped with the color image processing apparatus of the invention. For example, the following procedure may be employed. In a particular mode of color copier, known four color recording signals (C,M,Y,K) are stored in a memory of the copier and then output as a test print. The test print is read by an input device of the copier to produce L*a*b* signals. Then, the operations to Step 5 are executed by software of the copier and the results are stored in a predetermined memory. With this constitution, a variation of the characteristics of the recording device due to environmental variations can be compensated at a proper timing, so that color prints can be always produced in a stable manner.

As described above, first the UCR ratio is determined on the uniform color space considering image improvement factors other than the color reproduction within the black quantity setting range that is determined with the faithful color reproduction as a prerequisite. Then, the four output color signals are determined so as to satisfy the faithful color reproduction with respect to the black addition quantity thus determined. Therefore, the faithful color reproduction and the improvements of image qualities other than the color reproduction are realized at the same time. Further, since every processing step is device-independent and is performed using iso-perceptive lightness/chromaticity separation signals that well match the human perception, the invention can be applied to a variety of image recording devices irrespective of their types and necessary adjustments are performed in a manner compatible with the human perception.

Further, since the apparatus of the invention includes the nonlinear conversion circuit in the form of a combination of simple nonlinear operation units, it can operate at high speed and the four color parallel output processing can be realized by a small-size circuit configuration. The invention can provide much higher conversion accuracy than the conventional matrix-type color conversion by virtue of an increased degree of freedom of parameters. Compared with the polygonal line approximation type conversion (called the direct look-up table type conversion) on a color space in which conversion outputs for representative points on the color space are stored as a table and output values for arbitrary inputs are determined by linear interpolation on representative points in the vicinity of the inputs, the conversion of the invention is simpler in circuit constitution and superior in that the continuity and the differential continuity are assured in the input/output conversion to prevent quasi-outlines as would occur in reproducing an image including subtle color gradation in computer graphics etc.

Having the above advantages, the color image processing apparatus of the invention can be applied suitably to a wide variety of apparatuses such as a printing scanner, video printer, digital color copier and a color-proof system.

What is claimed is:

1. A color image processing method comprising the steps of:

receiving three input color signals produced by a color image input device by reading a document;

converting the three input color signals to three uniform color signals on a uniform color space;

determining a chroma signal from the three uniform color signals;

determining an under color removal ratio in accordance with a function of the chroma signal; and determining color output signals of four colors including black based on the three uniform color signals and the under color removal ratio.

2. The method of claim 1, wherein a relationship between the chroma signal and the under color removal ratio is made adjustable.

3. The method of claim 1, wherein at least part of operations of the color output signal determining step is performed by a plurality of nonlinear operation units connected one another.

4. The method of claim 1, wherein the color output signals of four colors are output in a parallel manner.

5. A color image processing method comprising the steps of:

receiving three input color signals produced by a color image input device by reading a document;

converting the three input color signals to three uniform color signals on a uniform color space;

determining a chroma signal from the three uniform color signals;

determining an under color removal ratio in accordance with a function of the chroma signal;

determining color output signals of four colors including black based on the three uniform color signals and the under color removal ratio;

making a relationship between the chroma signal and the under color removal ratio adjustable; and determining the under color removal ratio α according to a function $$\alpha = Ak_i \text{ for } C^* < C^*_1$$

$$\alpha = (C^* - C^*_1)(Ak_2 - Ak_1)/(C^*_2 - C^*_1 + Ak_1) \text{ for } C^*_1 \leq C^* < C^*_2$$

$$\alpha = Ak_2 \text{ for } C^*_2 \leq C^*$$

where $C^*$ is the chroma signal and $(C^*_1, Ak_1)$ and $(C^*_2, Ak_2)$ are adjusting parameters.

6. A color image processing method comprising the steps of:

receiving three input color signals produced by a color image input device by reading a document;

converting the three input color signals to three uniform color signals on a uniform color space;

determining a chroma signal from the three uniform color signals;

determining an under color removal ratio in accordance with a function of the chroma signal;

determining color output signals of four colors including black based on the three uniform color signals and the under color removal ratio;

making a relationship between the chroma signal and the under color removal ratio adjustable; and determining the under color removal ratio $\alpha$ according to a function $$\alpha = Ak_2 + (Ak_1 - Ak_2)[1 - \tan h\{(\pi/2)(C^* - a)/b\}]/2$$

$$a = (C^*_1 + C^*_2)/2$$

$$b = (C^*_2 - C^*_1)/2$$

where $C^*$ is the chroma signal and $(C^*_1, Ak_1)$ and $(C^*_2, Ak_2)$ are adjusting parameters, and $\alpha$ is fixed at 1 when the above equation takes a value larger than 1 and is fixed at 0 when the above equation takes a negative value.

7. A color image processing apparatus comprising:

means for receiving three input color signals produced by a color image input device by reading a document;

means for converting the three input color signals to three uniform color signals on a uniform color space;

means for determining a chroma signal from the uniform color signals;

means for determining an under color removal ratio in accordance with a function of the chroma signal; and means for determining color output signals of four colors including black based on the three uniform color signals and the under color removal ratio.

8. A color image processing apparatus comprising:

means for receiving three input color signals produced by a color image input device by reading a document;

means for converting the three input color signals to three uniform color signals on a uniform color space;

means for determining a chroma signal from the uniform color signals;

means for determining an under color removal ratio in accordance with a function of the chroma signal;

means for determining color output signals of four colors including black based on the three uniform color signals and the under color removal ratio; and wherein the under color removal ratio determining means includes:

means for receiving adjusting parameters $(C^*_1, Ak_1)$ and $(C^*_2, Ak_2)$; and means for determining the under color removal ratio $\alpha$ according to a function $$\alpha = Ak_1 \text{ for } C^* < C^*_1$$

$$\alpha = (C^* - C^*_1)(Ak_2 - Ak_1)/(C^*_2 - C^*_1) + Ak_1 \text{ for } C^*_1 \leq C^* < C^*_2$$

$$\alpha = Ak_2 \text{ for } C^*_2 \leq C^*$$

where $C^*$ is the chroma signal.

9. A color image processing apparatus comprising:

means for receiving three input color signals produced by a color image input device by reading a document;

means for converting the three input color signals to three uniform color signals on a uniform color space;

means for determining a chroma signal from the uniform color signals;

means for determining an under color removal ratio in accordance with a function of the chroma signal;

means for determining color output signals of four colors including black based on the three uniform color signals and the under color removal ratio; and wherein the under color removal ratio determining means includes:

means for receiving adjusting parameters $(C^*_1, Ak_1)$ and $(C^*_2, Ak_2)$; and means for determining the under color removal ratio $\alpha$ according to a function $$\alpha = Ak_2 + (Ak_1 - Ak_2)[1 - \tan h\{(\pi/2)(C^* - a)/b\}]/2$$

$$a = (C^*_1 + C^*_2)/2$$

$$b = (C^*_2 - C^*_1)/2$$

where $C^*$ is the chroma signal and $\alpha$ is fixed at 1 when the above equation takes a value larger than 1 and at 0 when the above equation takes the negative value.

10. A color image processing apparatus comprising:

means for receiving three input color signals produced by a color image input device by reading a document;

means for converting the three input color signals to three uniform color signals on a uniform color space;

means for determining a chroma signal from the uniform color signals;

means for determining an under color removal ratio in accordance with a function of the chroma signal;

means for determining color output signals of four colors including black based on the three uniform color signals and the under color removal ratio; and wherein the color output signal determining means includes a network circuit including a plurality of nonlinear operation units connected to one another.

11. The apparatus of claim 10, wherein each of the plurality of nonlinear operation units comprises:

means for applying a nonlinear function to a plurality of inputs to produce respective function results;

means for multiplying the function results by respective weights; and means for adding up multiplication results and adding a threshold to a sum of the multiplication results.

12. The apparatus of claim 11, wherein a combination of the nonlinear function applying means and the multiplying means is formed by an analog circuit, and wherein a unit circuit of the analog circuit comprises a differential amplifier having a pair of three-terminal amplifying elements having respective first terminals connected to each other and supplied with a current proportional to the weight, respective second terminals between which a voltage difference proportional to the input is applied, and respective third terminals a difference between currents flowing through which terminals serves as an output.

13. The apparatus of claim 11, wherein a combination of the nonlinear function applying means and the multiplying means is formed by an analog circuit, and wherein a unit circuit of the analog circuit comprises:

a first differential amplifier having first and second three-terminal amplifying elements having respective first terminals connected to each other to form a first weight terminal;

a second differential amplifier having third and fourth three-terminal amplifying elements having respective first terminals connected to each other to form a second weight terminal;

a first input terminal being a connection of respective second terminals of the first and fourth three-terminal amplifying elements;

a second input terminal being a connection of respective second terminals of the second and third three-terminal amplifying elements;

a first output terminal being a connection of respective third terminals of the first and third three-terminal amplifying elements; and a second output terminal being a connection of respective third terminals of the second and fourth three-terminal amplifying elements, wherein a voltage difference proportional to the input is applied between the first and second input terminals, and a current difference proportional to the weight is applied between the first and second weight terminals, so that a difference between currents flowing through the first and second output terminals serves as an output that is proportional to a product of a result of applying a bounded, monotonic function to the input and the positive or negative weight.

14. The apparatus of claim 11, wherein the color output signal determining means further comprises means for optimizing the weights and the thresholds according to the back propagation method.

* * * * *

UNITED STATES PATENT AND TRADEMARK OFFICE
CERTIFICATE OF CORRECTION

PATENT NO. : 5,502,579
DATED : March 26, 1996
INVENTOR(S) : Shinji KITA et al.

It is certified that error appears in the above-indentified patent and that said Letters Patent is hereby corrected as shown below:

```
Claim 3, column 12, line 30, insert --to--
before "one another".
```

Signed and Sealed this

Fifteenth Day of October, 1996

Attest:

BRUCE LEHMAN

*Attesting Officer*     *Commissioner of Patents and Trademarks*